United States Patent
Burt et al.

(10) Patent No.: US 6,522,808 B1
(45) Date of Patent: Feb. 18, 2003

(54) SYSTEM AND METHOD FOR WRITING FIBER GRATINGS AND OTHER COMPONENTS

(75) Inventors: Ronald L. Burt, Painted Post, NY (US); Joshua J. Dahlman, Painted Post, NY (US); Tiffanie G. D'Alberto, Corning, NY (US); James E. McGinnis, Big Flats, NY (US); Walter L. Morgan, Painted Post, NY (US); Robert O'Loughlin, Jr., Big Flats, NY (US); Edward M. Schmidlin, Corning, NY (US); Michael G. Shultz, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/483,825

(22) Filed: Jan. 15, 2000

(51) Int. Cl.$^7$ .................................................. G02B 6/34
(52) U.S. Cl. ........................................ 385/37; 430/290
(58) Field of Search .............................. 385/37, 33, 36; 430/290

(56) References Cited

U.S. PATENT DOCUMENTS

| | | | | |
|---|---|---|---|---|
| 5,953,472 A | * | 9/1999 | Boschis et al. | ................ 385/37 |
| 6,081,640 A | * | 6/2000 | Ouellette et al. | ............. 385/37 |
| 6,201,911 B1 | * | 3/2001 | Jang | ............................ 385/37 |

* cited by examiner

Primary Examiner—John D. Lee
Assistant Examiner—Sarah U Song
(74) Attorney, Agent, or Firm—Mary Y. Redman

(57) ABSTRACT

A system for writing fiber gratings has a plurality of writing stations, each writing station including a fiber mounting fixture for receiving an optical fiber to be exposed to a beam from a laser. The system includes a data capture module for capturing data generated from the exposure of optical fibers in each of the writing stations, and a steering assembly for directing the laser beam to each of the plurality of writing stations in turn.

12 Claims, 12 Drawing Sheets

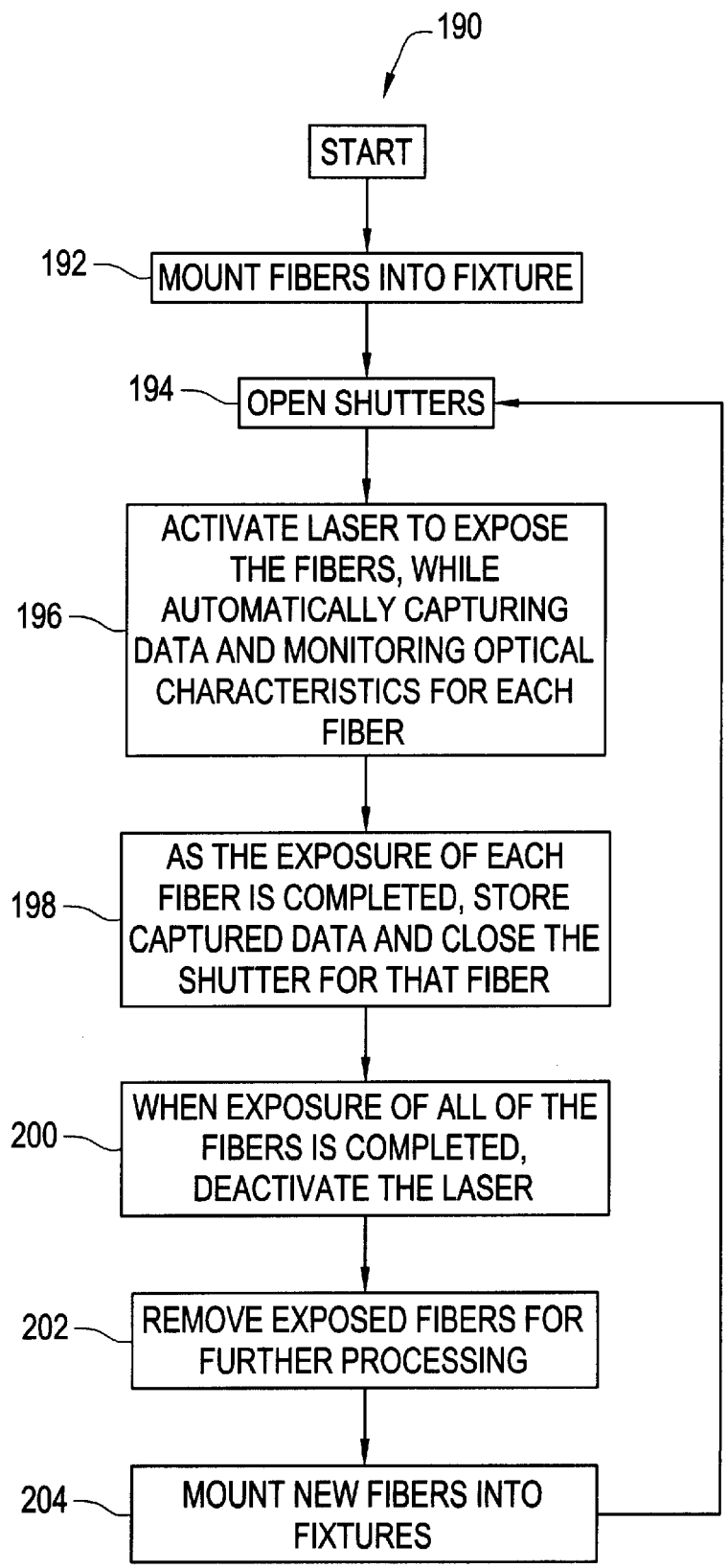

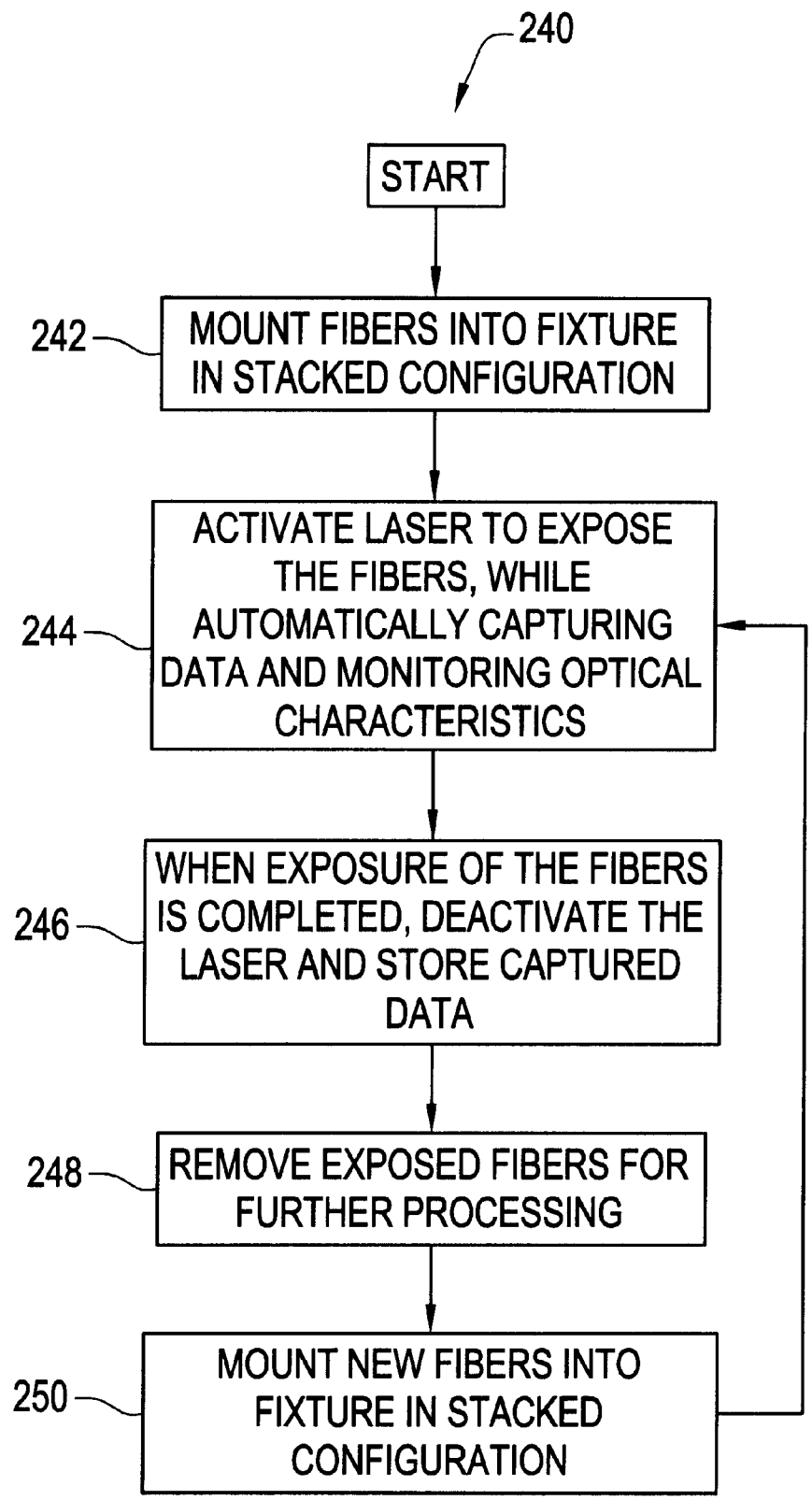

SYSTEM AND METHOD FOR WRITING FIBER GRATINGS AND OTHER COMPONENTS

BACKGROUND OF THE INVENTION

1. Field of the Invention

The present invention relates generally to systems for manufacturing optical components, and particularly to systems and methods for optimizing laser utilization in the writing of fiber gratings and other similar components.

2. Technical Background

A fiber Bragg grating (FBG) is a pattern of regions of increased refractive index permanently written into the core of a single-mode optical fiber. The filters are written by transversely exposing the core to high-power ultraviolet (UV) radiation from a UV laser that has passed through a phasemask to create an interference pattern. The interference pattern causes corresponding structural changes in the core of the fiber, resulting in a permanent and stable modification of the core's refractive index in predetermined periodic locations.

The writing of an FBG is typically a multi-step process, which includes mounting the fiber into a writing system, connecting the fiber to a measurement system, exposing the fiber to UV radiation, collecting and logging data, and removing the fiber from the writing system for further processing elsewhere. Typical systems for writing an FBG can only process a single fiber at a time. Thus, all of the steps in the writing process must be completed for each FBG before the next FBG can be processed.

Because a laser represents a significant capital outlay, it is desirable for the writing process to be as efficient as possible. In particular, it is desirable for the throughput of the laser-writing system to be increased, without the expense of providing additional lasers. In addition, it is desirable for a single system to be able to process batches of FBGs having different wavelength characteristics without having to reconfigure the system.

SUMMARY OF THE INVENTION

One aspect of the invention advantageously provides a system for writing fiber gratings having a plurality of writing stations, each writing station including a fiber mounting fixture for receiving an optical fiber to be exposed to a beam from a laser. The system includes a data capture module for capturing data generated from the exposure of optical fibers in each of the writing stations, and a steering assembly for directing the laser beam to each of the plurality of writing stations in turn.

Another aspect of the invention includes a method for writing fiber gratings by providing writing stations, each including a fiber mounting fixture; providing a steering assembly to direct the laser beam to each station in turn; sequentially mounting fresh optical fiber into the fiber mounting fixtures; exposing the mounted fiber to the laser beam; capturing data for each exposed fiber; and replacing the exposed fibers with fresh optical fiber. The mounting of the fresh optical fiber and the replacement of the exposed fibers with fresh optical fibers at one station is performed while fiber is being exposed to the laser beam at another writing station.

In another aspect, the invention includes a system for writing fiber gratings which includes a beam-shaping optical assembly for shaping a laser beam and a lens for focusing the beam. An array of beamsplitters splits the focused, shaped laser beam into a plurality of sub-beams. This system also includes fiber mounting fixtures. Each lies in the path of a laser sub-beam and has associated therewith a shutter for selectably preventing stray light from entering that fixture.

In another aspect, the invention includes a system for writing fiber gratings that includes an array of mirrors for dividing a laser beam into separate sub-beams. This system also includes an array of beam-shaping optical assemblies corresponding to the plurality of sub-beams. Each beam-shaping optical assembly shapes a respective sub-beam. An array of fiber mounting fixtures corresponding to the array of beam-shaping optical assemblies has each fiber-mounting fixture in the array positioned to receive a shaped laser sub-beam. Each fiber-mounting fixture has associated with it a shutter for selectably preventing stray light from entering that fiber-mounting fixture.

In another aspect, the invention includes a system for exposing optical fibers to a laser beam, including exposure stations, each of which includes a fiber mounting fixture for receiving an optical fiber to be exposed to a laser beam. A data capture module captures data generated from the exposure of optical fibers in each of the stations. A steering assembly directs the laser beam to each of the stations in turn.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 7 is a flowchart of a further embodiment of an FBG writing method according to the present invention that may be used with the writing systems shown in FIGS. 5 and 6A–B.

FIG. 9 is a flowchart of a further embodiment of an FBG writing method according to the present invention that may be used with the writing system shown in FIGS. 8A and 8B.

DETAILED DESCRIPTION

Figure 1A:
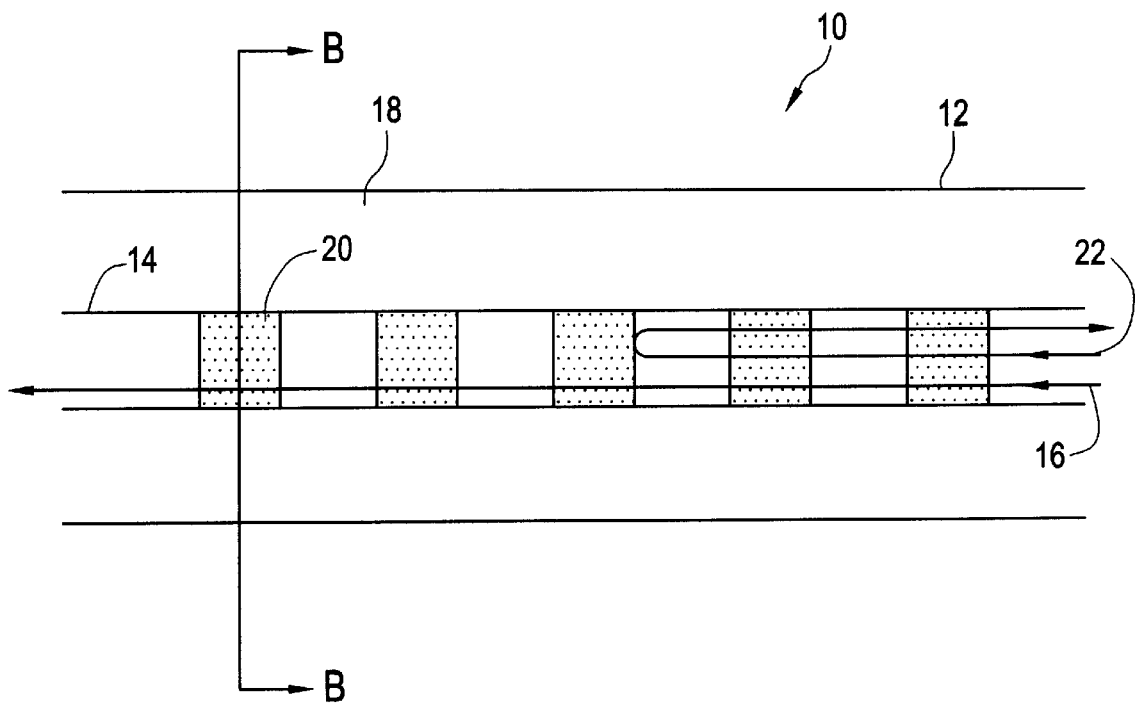
FIG. 1A is a schematic side view of an exemplary fiber Bragg grating (FBG).
Figure 1B:
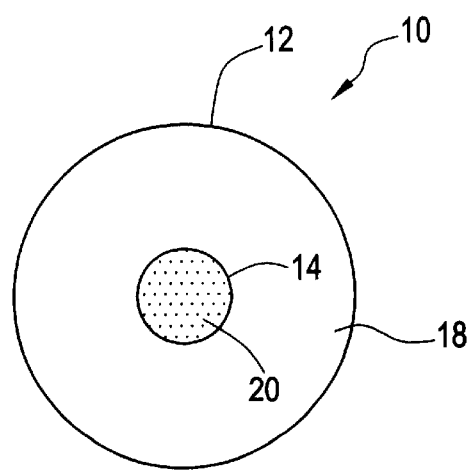
FIG. 1B is a cross section of the FBG shown in FIG. 1A through the plane B—B.

FIG. 1A shows a schematic side view of an exemplary fiber Bragg grating (FBG) 10, and FIG. 1B shows a cross section of the FBG 10 through the plane B—B. The FBG 10 is formed directly into a section of optical fiber 12 that includes a core section 14 for carrying an optical signal 16, and an overclad layer 18 surrounding the core 14. The core 14 includes a series of regions 20 having a higher index of refraction. This pattern of periodic refractive index change regions 20 makes up the grating 10.

Figure 2:
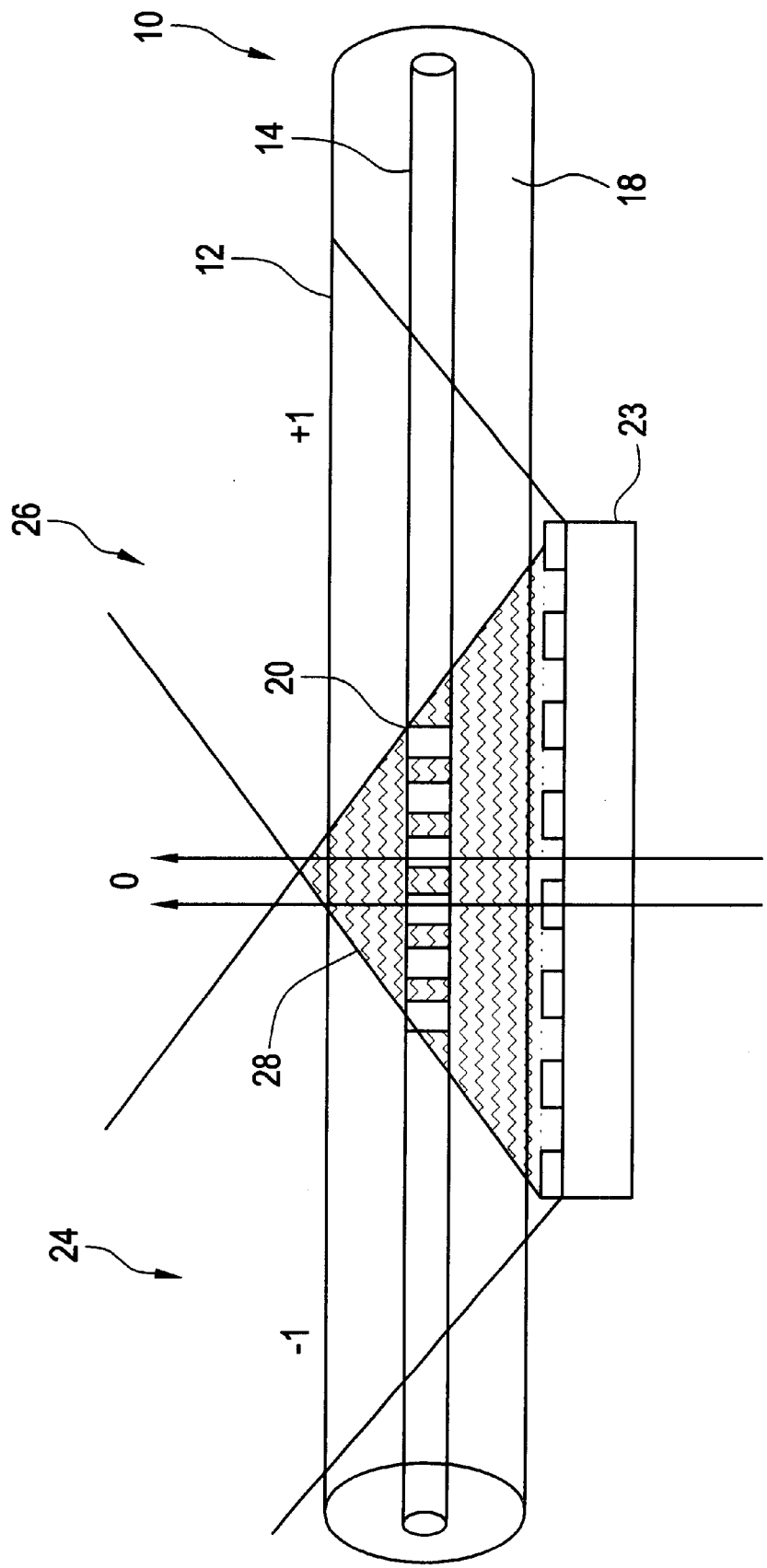
FIG. 2 is a side view of an FBG being formed by exposure to UV laser radiation.

The process of writing a grating into an optical fiber is based upon the photosensitivity of the fiber's core material. When the core of an optical fiber is exposed to high-powered UV radiation for a certain length of time, the core material undergoes a controllable structural change, permanently altering its refractive index. Typical systems use a phasemask to introduce an interference pattern in a UV laser beam. The interference pattern includes regions of higher intensity that correspond to the desired location of reflective regions within the optical fiber core. This approach is illustrated schematically in FIG. 2, where a phasemask 23 is used to divide a UV laser beam into two out-of-phase components 24 and 26 that produce a series of interference bands 28 cutting through the optical fiber core 14. These bands result in the formation of periodic reflective regions 20 at predetermined locations along the core 14.

In typical FBG writing systems, each FBG is written one at a time. Further, each writing system's optical setup is tailored to the specific product line needed for that time period, with downtime for changeover required when production demands change. As the FBG is formed, it is monitored by an optical spectrum analyzer (OSA) for reflection and transmission to determine the stopping point. The writing process is typically completed within 2 to 30 minutes, depending upon the product being manufactured.

Figure 3:
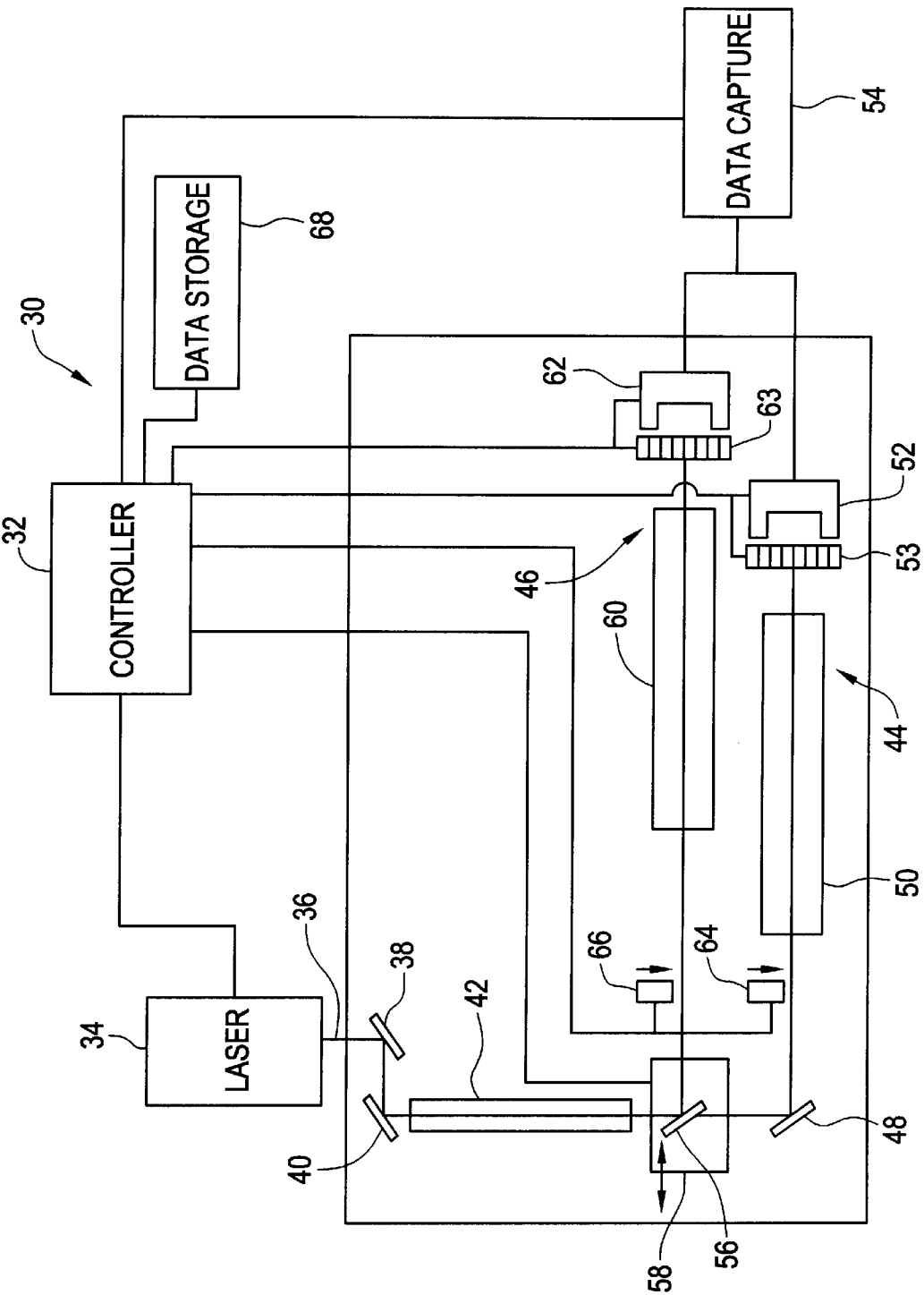
FIG. 3 is a schematic diagram of a first embodiment of an FBG writing system according to the present invention.

FIG. 3 shows a first embodiment of a table layout for an FBG writing system 30 according to the present invention. The system is operated by a microprocessor controller 32 or other suitable computing device that coordinates the various components of the system and stores data, as required. A UV laser 34 emits a laser beam 36 that is directed by a pair of steering mirrors 38 and 40 into a beam-shaping optical assembly 42. The shaped laser beam 36 is then directed to either of two separate FBG writing stations, a lower FBG writing station 44 and an upper FBG writing station 46. The positions of the two writing stations 44, 46 are offset so that the length of the laser beam path is the same for both stations. Although the embodiment of the invention illustrated in FIG. 3 shows two FBG writing stations, it will be appreciated that it would be possible to use additional writing stations without departing from the spirit of the present invention.

In the lower FBG writing station 44, the laser beam 36 is directed by a fixed turning mirror 48 into a first beam delivery optical assembly 50. Although in the present embodiment of the invention the turning mirror 48 is fixed in position, it would also be possible within the spirit of the present invention to use a movable turning mirror mounted onto a translation stage. The laser beam is delivered to a first fiber mounting fixture 52 behind a phasemask 53 that produces an interference pattern on the optical fiber to be exposed. Data generated during the exposure of an optical fiber held in the fiber mounting fixture 52 are captured by a suitable automatic data capture module 54 and monitored by the system controller 32 to determine when exposure is completed, at which time the final captured data is stored in a suitable storage device 68, such as a hard drive. The data capture module 54 can be implemented using an optical spectrum analyzer (OSA) or other suitable device that continuously captures data from the fiber exposure process and passes the data in suitable form to the controller 32 or other coordinating computer.

As described in greater detail below, the laser beam 36 may be selectably directed to the upper FBG writing station 46 by a second turning mirror 56 that is mounted to a translation stage 58. The translation stage 58 moves the second turning mirror 56 into and out of the path of the laser beam 36, as directed by the controller 32. The second writing system 46 includes its own beam delivery optical assembly 60 and a fiber mounting fixture 62, including a phasemask 63, connected to the data capture module 54. A pair of pneumatically actuated shutters 64 and 66, operated by the controller 32, is provided in order to prevent stray light from one system reaching the other.

If additional writing stations are desired, the first and second writing stations 44, 46 are moved downward and the additional stations are added above the second writing station 46, below the beam-shaping optical assembly 42. Each additional station is provided with its own shutter and a movable turning mirror mounted onto a translation stage. The positions of the added writing stations are offset to maintain the same laser beam path length. Each of the movable mirrors has two positions, one in which the mirror lies in the path of the laser beam to direct the beam to the mirror's respective writing station, and one in which the mirror has been moved out of the path of the laser beam. Initially, the movable mirrors are all moved out of the path of the laser beam, such that the fixed turning mirror 48 mirror directs the laser beam to the lowermost writing station. The movable mirrors are then moved successively into and out of the path of the laser beam one at a time to direct the laser beam to successive writing stations.

It will be appreciated that although the use of movable turning mirrors is illustrated in FIG. 3, other steering assemblies may be used to direct the laser beam to each of the writing stations in turn. For example, in a system having two writing stations, it would be possible to use a beamsplitter in a steering assembly in place of turning mirrors.

The typical process for writing an FBG comprises the following steps:
  (1) mounting of the fiber into the fiber mounting fixture and connection of the fiber to the measurement system;
  (2) exposing the fiber to the laser beam;
  (3) monitoring the exposure of the fiber to the laser beam;
  (4) collecting and logging data; and
  (5) removing the exposed fiber from the fixture and the measurement system and transferring the exposed fiber to the next manufacturing stage.

This process is then repeated, as desired. In such FBG writing systems, each FBG is written separately, with each of the above steps being completed for a single fiber before the next fiber can be processed.

By contrast, using the system shown in FIG. 3, it is possible to perform these steps in tandem for a plurality of FBGs. Through the coordination of motorized stages, software controls, and timing, laser utilization can improve by 100%, thereby doubling throughput. While a fiber is being exposed in the first system, the previously written fiber on the second system is removed for the next processing step. A new fiber is spliced in the second system's measurement system and mounted into position. When the first system's fiber has been exposed to the correct specifications (monitored in situ as the process control), the data is automatically captured and stored. Operation continues in the same manner with the second system receiving the UV exposure. Kinematic fiber mounts allow for fiber handling off of the table so as not to disturb the exposure conditions of the currently active system.

Figure 4:
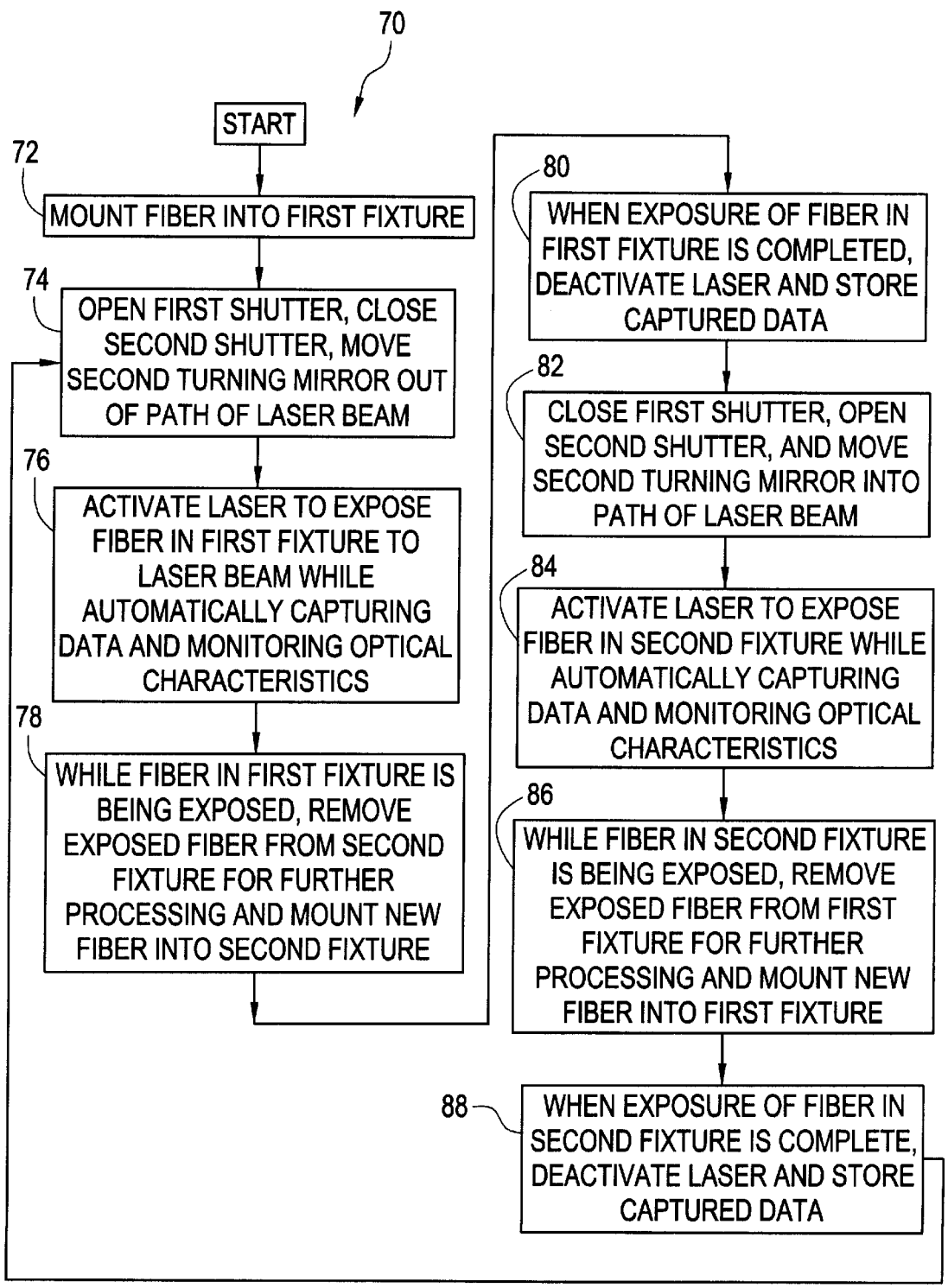
FIG. 4 is a flowchart of a first embodiment of an FBG writing method according to the present invention that may be used with the FIG. 3 writing system.

FIG. 4 is a flowchart illustrating a first embodiment of an FBG writing method 70 according to the present invention, using a system such as the system 30 shown in FIG. 3. In step 72, fiber is mounted into the first fiber mounting fixture 52 and connected to an optical spectrum analyzer (OSA) or other suitable measurement device. In step 74, the system is configured to expose the fiber in the first fixture to the UV laser beam 36. This includes opening the first shutter 64, closing the second shutter 66, and moving the second turning mirror 56 out of the path of the laser beam 36. These three operations can be performed in any order, or even simultaneously.

In step 76, the laser 34 is activated to expose fiber mounted into the first fiber mounting fixture 52. As the fiber is exposed, data is automatically captured by module 54 and passed along, in suitable form, to the system controller 32. In step 78, while the fiber in the first fixture is being exposed, the human operator removes exposed fiber from the second fixture 62 for further processing outside of the writing system if such fiber has been previously exposed, as will be the case in ongoing processing. It will be recognized that if step 78 is being performed for the first time in the current batch, then there will be no exposed fiber to remove from the second fixture 62. Once the exposed fiber, if any, is removed, the human operator then mounts fresh fiber into the second fixture 62 and connects that fiber to the measurement system.

In step 80, when the exposure of the fiber in the first fixture 52 is completed, the laser is deactivated. A final set of data for the freshly fabricated optical device is captured by module 54 and passed along to the system controller 32, where it is stored on a hard disk or other suitable long-term medium 68. In step 82, the system is then reconfigured by the controller 32 to expose the fiber mounted into the second fiber mounting fixture 62. This reconfiguration step includes closing the first shutter 64, opening the second shutter 66, and moving the second turning mirror 56 into the path of the laser beam. Again, these operations can be performed in any order, or simultaneously. In step 84, the laser is reactivated to expose fiber mounted into the second fixture 62. Again, module 54 performs an automatic data capture and analysis function as the fiber is exposed to the laser beam 36.

In step 86, while the fiber in the second fixture is being exposed to the laser beam, the exposed fiber is removed from the first fixture and disconnected from the measurement system for further processing. Fresh fiber is then mounted into the first fixture and connected to the measurement system. In step 88, when the exposure of the fiber in the second fixture has been completed, the laser is deactivated and the final data are captured by module 54 and stored by the system controller 32. The system them returns to step 74, where it is reconfigured to expose the fiber mounted into the first fixture 52. Steps 74 through 88 are then repeated, as desired. It will be appreciated that the method illustrated in FIG. 4 may be readily modified to accommodate a system having more than two writing stations without departing from the spirit of the present invention.

The FBG writing system described above has several advantages over current writing processes. In addition to allowing the four-step writing process to be conducted in parallel for separate fibers, the system allows for versatile output. Using the above-described system, it is possible to run two systems on the same product, or each system can run separate products so long as those products can share the same beam shape. It is also possible to place the beam shaping optics after the mirrors for increased flexibility. Customers requests for shipments of FBGs for a variety of wavelengths rather than a single wavelength may have given rise to the need for multiple writing systems or numerous job changes to a single writing system. The present system allows the same writing system to be used with fewer job changes.

Figure 5:
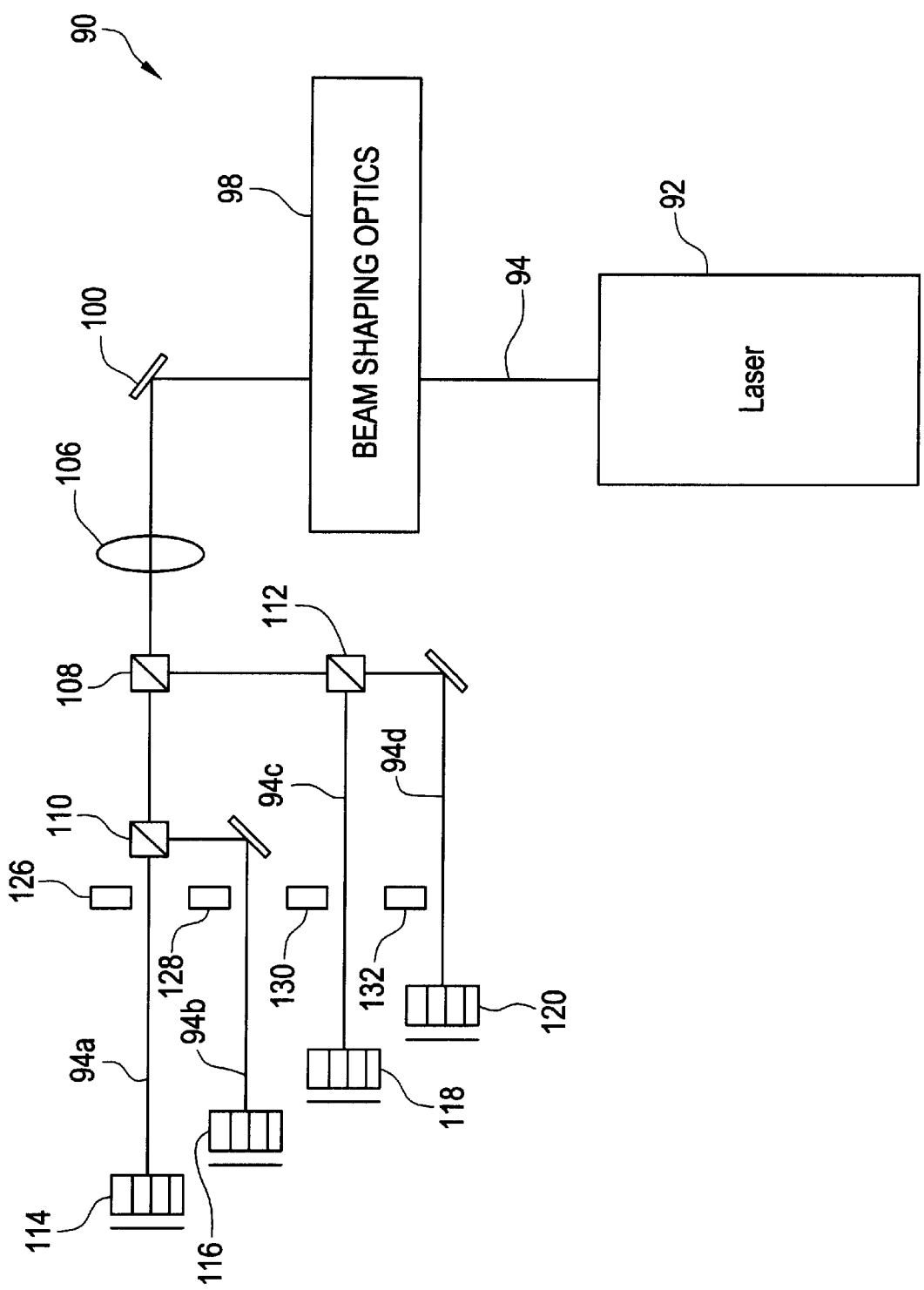
FIG. 5 is a schematic diagram of a further embodiment of an FBG writing system according to the present invention employing a beam-splitting technique.

FIG. 5 shows an alternative embodiment of a system 90 for writing FBGs, in which multiple FBGs are exposed simultaneously using a beam-splitting technique. The FIG. 5 system includes a laser 92 that emits a UV laser beam 94. The laser beam 94 is directed into a beam-shaping optical assembly 98. The shaped laser beam 94 is then directed by a mirror 100 to lens 106, which focuses the beam 94 into an array of beamsplitters 108, 110, 112. The laser beam 94 is thus split into four sub-beams 94a–d. Sub-beams 94a and 94c are passed directly to fiber mounting fixtures 114 and 118. Sub-beams 94b and 94d are directed to fiber mounting fixtures 116 and 120 by mirrors 122 and 124. The sub-beams 94a–d are provided with respective shutters 126, 128, 130, 132, which prevent stray light from reaching the wrong fixture. This would be particularly important, for example, where the fibers in fixtures 114, 116, 118, and 120 are exposed to the laser beam for different periods of time.

Using the embodiment shown in FIG. 5, each fiber may be monitored and controlled individually. Additionally, such a system may suitably employ different phasemasks from station to station. This flexibility offers the benefit of manufacturing multiple product lines from the same UV laser beam, reducing the frequency of downtime for production changes and increasing throughput, as well as the variety of products that can be manufactured. The number of beamsplitters and writing stations is limited by the power and writing efficiency of the laser beam.

Figure 6A:
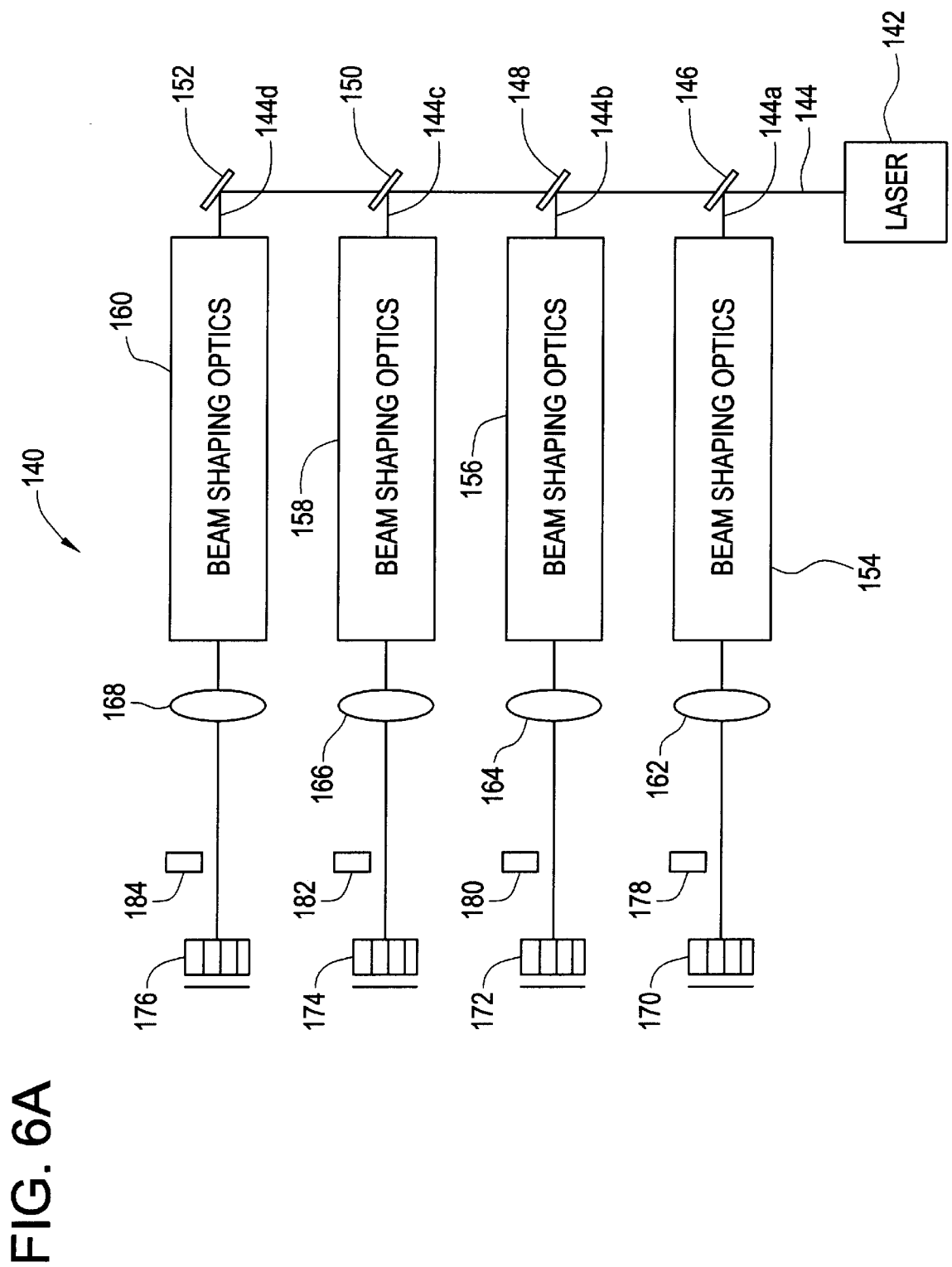
FIG. 6A is a schematic diagram of a further embodiment of an FBG writing system according to the present invention employing a multimirror technique.
Figure 6B:
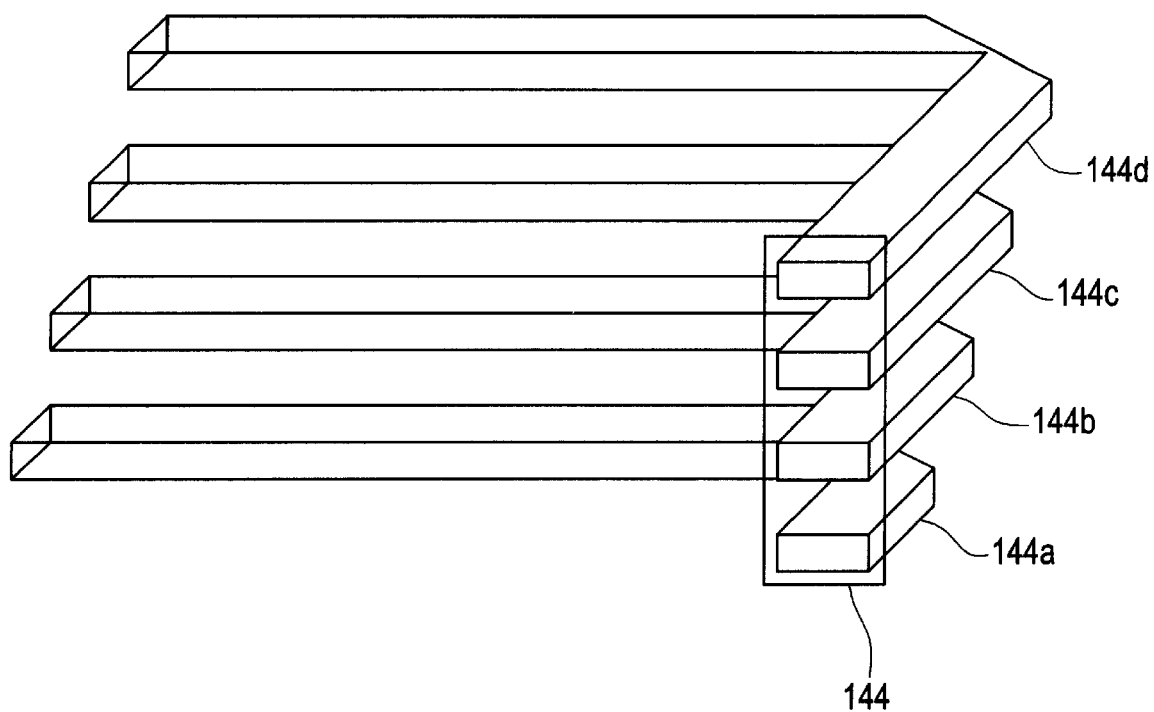
FIG. 6B is a schematic diagram illustrating the multimirror technique of FIG. 6A in greater detail.

FIGS. 6A and 6B are schematic drawings illustrating an alternative embodiment of a system 140 for writing multiple FBGs using a multimirror technique. In current FBG writing systems, the beam size from the UV laser is quite large. However, in order to make the beam compatible with downstream optics, an aperture is used along the beam shaping path to block all but a small percentage of light. The multimirror writing technique utilizes an array of several small mirrors displaced from each other in order to capture different slivers off the same beam. Each beam goes to its own beam-shaping path, where it can be apertured down further and modified as needed. The mirror dimensions are approximately 1–3 mm to allow four to five mirrors to span the beam without diffraction from the edge of one mirror interfering with the reflected beam of the next mirror in the series. An alternative embodiment uses larger mirrors to reflect larger portions of the beam.

As shown in FIG. 6A, the multimirror system 140 includes a UV laser 142 emitting a relatively wide UV laser beam 144, which is divided into four separate beams 144a–d by an array of four mirrors 146, 148, 150, 152, that guide the four beams into four respective beam-shaping optical assemblies 154, 156, 158, 160. The shaped beams are directed to four respective lenses 162, 164, 166, 168, which focus the beams onto four respective fiber mounting fixtures 170, 172, 174, 176. Four respective shutters 178, 180, 182, 184 are provided for preventing stray light from reaching the wrong fiber mounting fixture. The division of the laser beam 144 is illustrated in greater detail in FIG. 6B, which illustrates the laser beam 144 being divided into four separate beams 144a–d of equal intensity by four mirrors (not shown).

The system shown in FIGS. 6A and 6B utilizes more of the existing laser beam to write to multiple stations with no loss of power over the existing single grating techniques. Because each station has its own beam-shaping path, there is even greater flexibility in how a grating written at one station can differ from the next station. Throughput is enhanced and individual monitoring can be accomplished just as in the case for the beamsplitter method, shown in FIG. 5. However, there is no power-based limitation to the type of product that can be delivered with this technique. Finally, it should be noted that this method may be used in conjunction with any of the other multiple writing techniques.

FIG. 7 is a flowchart of a further embodiment of an FBG writing method 190 according to the present invention that may be used with the writing systems shown in FIGS. 5 and 6A–B. In step 192, fibers are mounted into the fiber mounting fixtures and connected to a measurement system. The shutters are opened in step 194, and in step 196 the laser is activated to expose the fibers, while automatically capturing data for each fiber. In step 198, as the exposure of each fiber is completed, data is captured and stored, and the respective shutter for that fiber is closed. In step 200, when the exposure of all of the fibers is completed, the laser is deactivated, and in step 202, the exposed fibers are removed from the fixtures for further processing. Finally, in step 204, new fibers are mounted into the fixtures. Steps 194 through 204 are repeated, as desired.

Figure 8B:
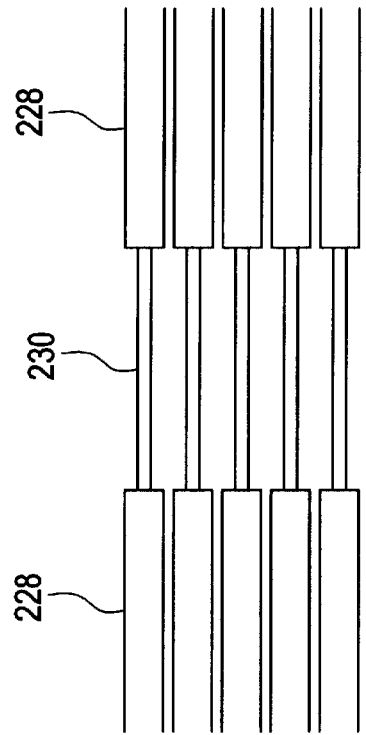
FIG. 8B provides a closeup view of the stacked fibers used in the system illustrated in FIG. 7A.
Figure 8A:
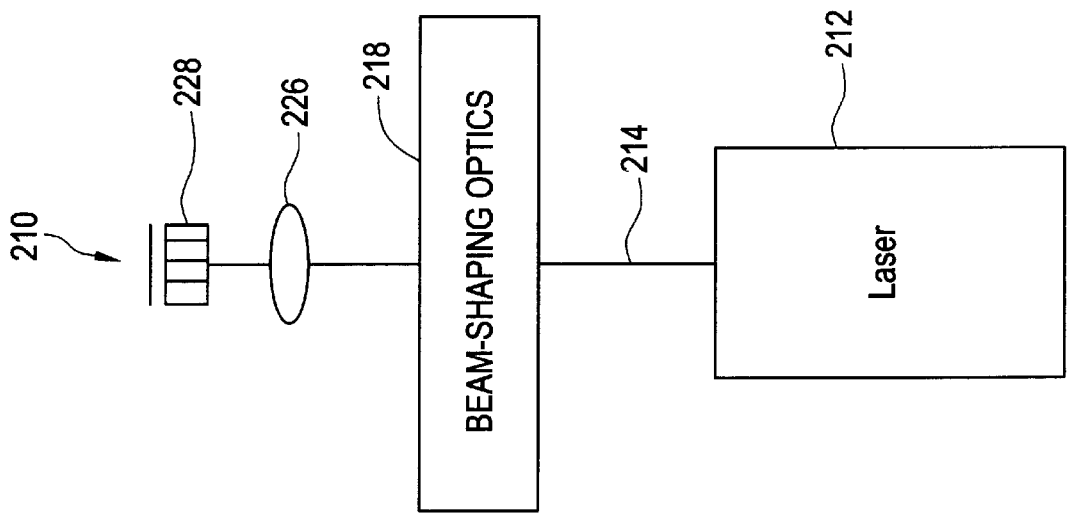
FIG. 8A is a schematic diagram of a further embodiment of an FBG writing system according to the present invention employing a stacked fiber configuration.

FIG. 8A shows an alternative embodiment of a system 210 for writing FBGs. The writing system 210 includes a laser 212 that emits a laser beam 214 that is directed by a mirror 216 into a beam shaping optical assembly 218. The shaped beam 214 is then directed to a lens 226, which focuses the beam onto a fiber mounting fixture 228. As shown in partial closeup view FIG. 8B, the fibers 230 are mounted in a stacked configuration into the fiber-mounting fixture 228. By defocusing the beam 214 slightly, more fibers can be exposed simultaneously at a cost of decreased fluence at each core. In the present embodiment of this system, one FBG is monitored as a representative during the exposure process to determine when the exposure is finished. At the end of the exposure process, exposure data with respect to each of the fiber devices in the stack are captured and stored. Due to the decrease in delivered UV beam power, the technique is currently limited to FBGs requiring low exposure times. Also, because of irregularities in the beam 214 and the inability to isolate the growth of each FBG in the stack, the grating specifications must allow for some process variability. It should be noted that it is possible to combine the stacking technique with any of the other system configurations described above.

FIG. 9 is a flowchart of a further embodiment of an FBG writing method 240 according to the present invention that may be used with the writing system shown in FIGS. 8A and 8B. In step 242, the optical fibers to be written are mounted in a stacked configuration into the fiber mounting fixture and connected to a measurement system. In step 244, the laser is activated to expose the fibers, while automatically capturing data and monitoring optical characteristics. As mentioned above, the laser beam is slightly defocused. In step 246, when the exposure of the fibers is completed, the laser is deactivated and data is captured and stored for all fibers in the stack. In step 248 the exposed fibers are removed for further processing. Finally, in step 250, new fibers to be exposed are mounted in a stacked configuration into the fiber-mounting fixture. Steps 244 through 250 are repeated, as desired.

Figure 10A:
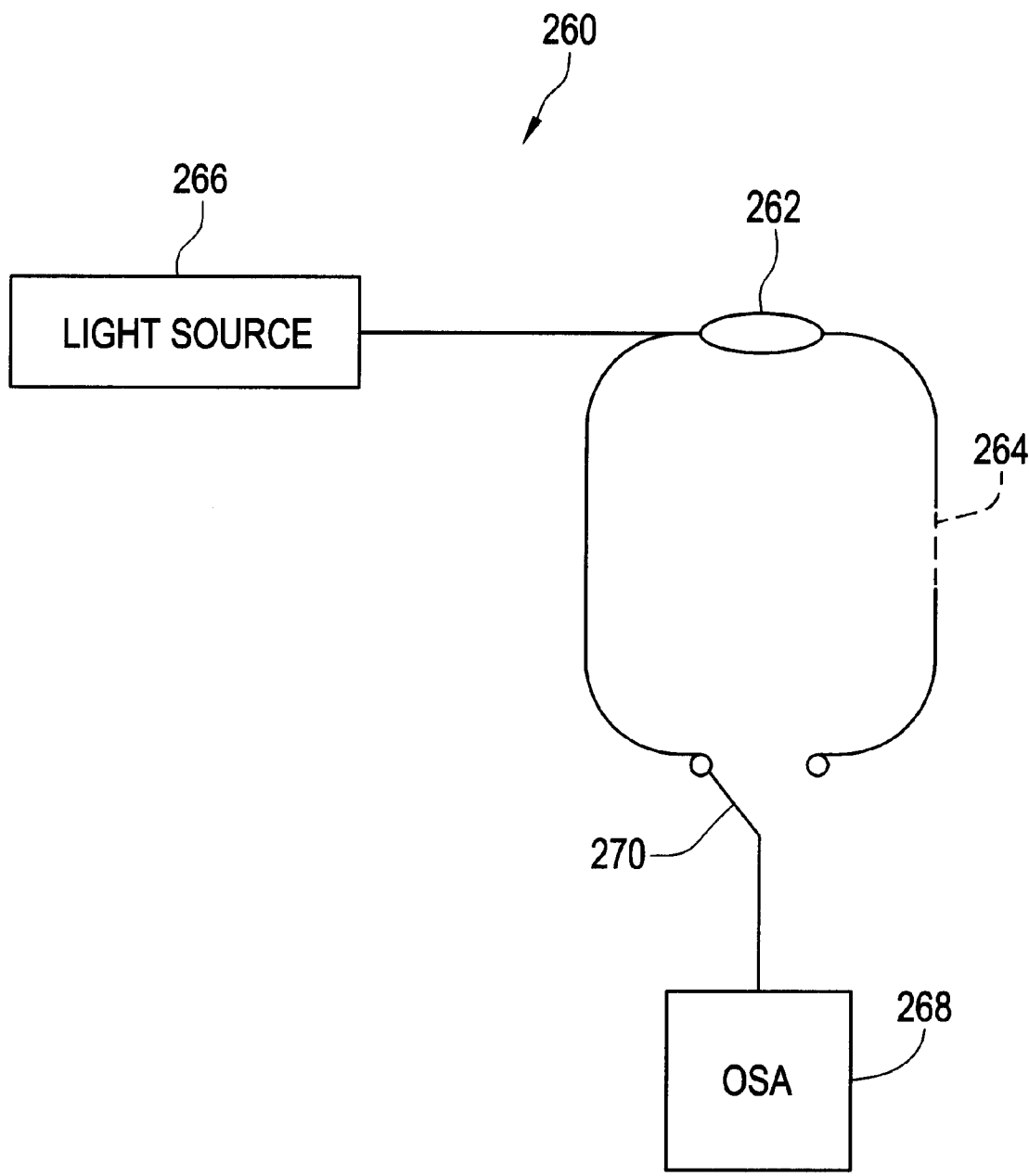
FIG. 10A is a schematic diagram of a configuration according to the prior art for connecting an FBG into a measurement system.
Figure 10B:
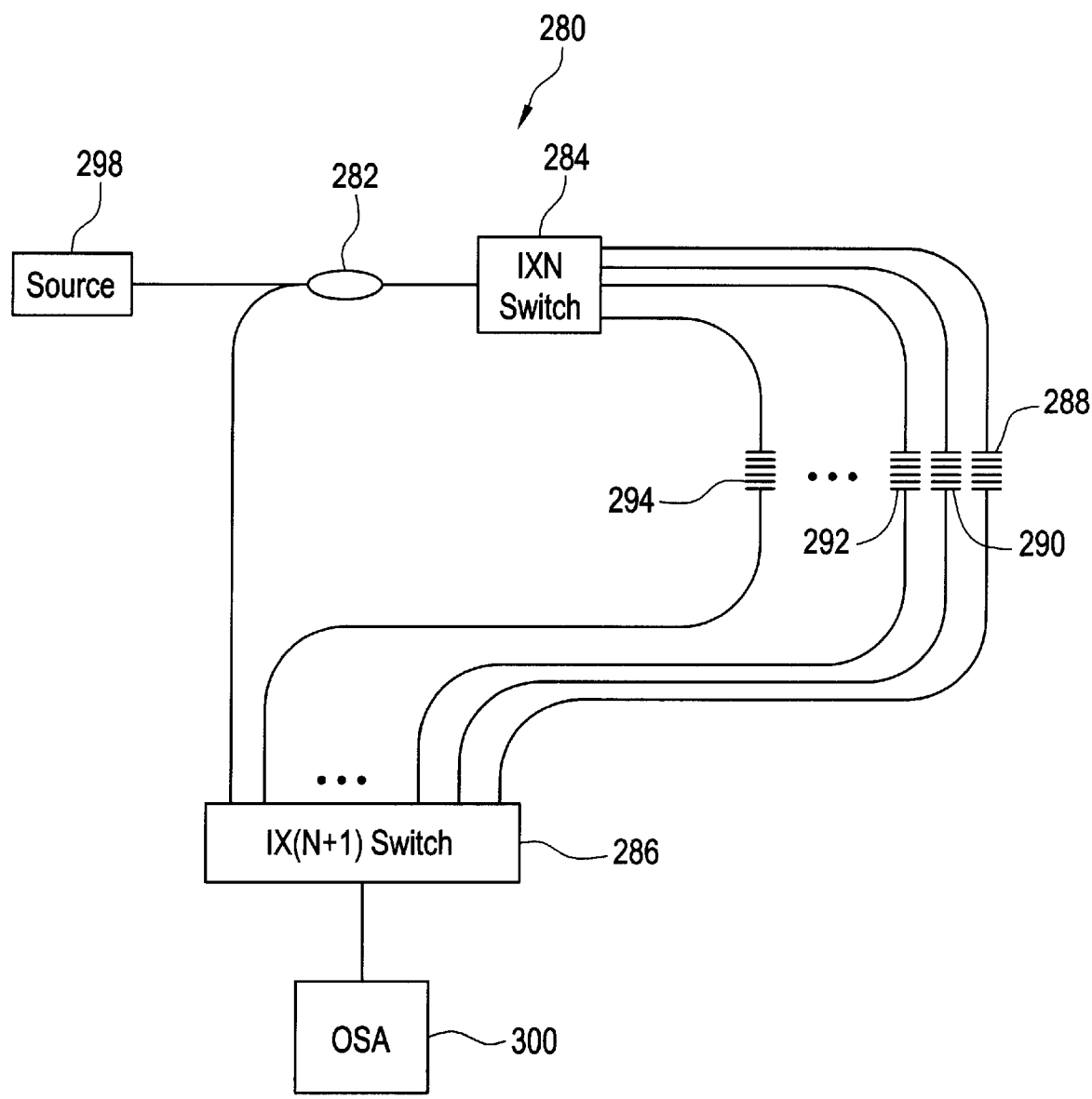
FIG. 10B is a schematic diagram of a configuration according to the present invention for connecting multiple FBGs into a measurement system.

FIGS. 10A and 10B are schematic diagrams showing changes that can be made to a measurement system to measure N product lines simultaneously. FIG. 10A shows a currently used configuration of a measurement system 260, in which a coupler 262 is used to connect an FBG 264 to a light source 266. An optical spectrum analyzer (OSA) 268 is selectably connected to the grating 264 by a switch 270. FIG. 10B shows a modified configuration of a measurement system 280, in which a coupler 282, a 1×N switch 284 and a 1×(N+1) switch 286 are used to connect a plurality of FBGs 288–294 to a light source 298. The switches 284, 286 operate to create parallel monitoring loops for each of the FBGs 288–296. An OSA 300 or other suitable monitoring device queries each of the FBGs, as needed.

While the foregoing description includes details which will enable those skilled in the art to practice the invention, it should be recognized that the description is illustrative in nature and that many modifications and variations thereof will be apparent to those skilled in the art having the benefit of these teachings. For example, while the above laser-optimization techniques are well suited for writing FBGs and are disclosed principally in this context, they can also be applied to writing other kings of gratings and to other manufacturing systems using lasers. It should be further noted that the above techniques may be combined, as desired. It is accordingly intended that the invention herein be defined solely by the claims appended hereto and that the claims be interpreted as broadly as permitted by the prior art.

We claim:

1. A system for writing fiber gratings, comprising:
    a plurality of writing stations, each writing station including a fiber mounting fixture for receiving a different one of a plurality of optical fibers each of which is to be exposed to a beam from a laser;
    a data capture module for capturing data generated from the exposure of optical fibers in each of the writing stations; and
    a steering assembly for directing the laser beam to each of the plurality of writing stations in turn.

2. The system of claim 1, wherein the steering assembly comprises:
    a first turning mirror in the path of the laser beam for directing the laser beam to a first writing station in the plurality of writing stations, each additional writing station in the plurality of writing stations having associated therewith a movable turning mirror mounted onto a translation stage, each movable mirror being movable into the path of the laser beam to direct the laser beam to the writing station associated with that movable mirror, such that the laser beam can be directed to each of the plurality of writing stations in turn.

3. The system of claim 1, further including:
    a plurality of shutters, each shutter associated, respectively, with each of the plurality of writing stations for preventing stray light from entering a writing station when the laser beam is being directed to another writing station.

4. The system of claim 1, further including a beam-shaping optical assembly for shaping the laser beam before it is directed to the plurality of writing stations.

5. The system of claim 1, further including a plurality of beam-shaping optical assemblies, each beam-shaping optical assembly being associated with one of the plurality of writing stations for shaping the laser beam after it is steered to that writing station.

6. The system of claim 1, wherein each of the plurality of writing stations includes a beam-delivery optical assembly for delivering the laser beam to that writing station's fiber mounting fixture.

7. A method for writing fiber gratings, comprising the following steps:
   (a) providing a plurality of writing stations, each writing station including a fiber mounting fixture for receiving an optical fiber to be exposed to a beam from a laser;
   (b) providing a steering assembly to direct the laser beam to each of the plurality of writing stations in turn;
   (c) sequentially mounting fresh optical fiber into the fiber mounting fixtures of each of the plurality of writing stations, exposing the mounted fiber to the laser beam, capturing data for each exposed fiber, and replacing the exposed fibers with fresh optical fiber, the mounting of the fresh optical fiber and the replacement of the exposed fibers with fresh optical fibers at each writing station being performed while optical fiber is being exposed to the laser beam at another writing station.

8. A system for writing fiber gratings, comprising:
   a beam-shaping optical assembly for shaping a laser beam;
   a lens for focusing the shaped laser beam;
   an array of beam-splitters for splitting the focused, shaped laser beam into a plurality of sub-beams;
   a plurality of fiber mounting fixtures, each of the fiber mounting fixtures lying in the path of a laser sub-beam, each fiber mounting fixture having associated therewith a shutter for selectably preventing stray light from entering that fiber mounting fixture.

9. A system for writing fiber gratings, comprising:
   an array of mirrors for dividing a laser beam into a plurality of separate beams;
   an array of beam-shaping optical assemblies corresponding to the plurality of sub-beams, each beam-shaping optical assembly shaping a respective sub-beam; and
   an array of fiber mounting fixtures corresponding to the array of beam-shaping optical assemblies, each fiber mounting fixture in the array being positioned to receive a shaped laser sub-beam, each fiber mounting fixture having associated therewith a shutter for selectably preventing stray light from entering that fiber mounting fixture.

10. A system for exposing optical fibers to a laser beam, comprising:
    as plurality of exposure stations, each station including a fiber mounting fixture for receiving a different one of a plurality of optical fibers each of which is to be exposed to a beam from a laser;
    a data capture module for capturing data generated from the exposure of optical fibers in each of the stations; and
    a steering assembly for directing the laser beam to each of the plurality of stations in turn.

11. The system of claim 10, wherein the steering assembly comprises:
    a first turning mirror in the path of the laser beam for directing the laser beam to a first station in the plurality of stations, each other station in the plurality of stations having associated therewith a movable turning mirror mounted onto a translation stage, each movable mirror being movable into the path of the laser beam to direct the laser beam to the station associated with that movable mirror, such that the laser beam can be directed to each of the plurality of stations in turn.

12. The system of claim 10, further including:
    a plurality of shutters, each shutter associated, respectively, with each of the plurality of stations for preventing stray light from entering a station when the laser beam is being directed to another one of the plurality of stations.

\* \* \* \* \*

UNITED STATES PATENT AND TRADEMARK OFFICE
CERTIFICATE OF CORRECTION

PATENT NO. : 6,522,808 B1 Page 1 of 1
DATED : February 18, 2003
INVENTOR(S) : Burt Ronald et al.

It is certified that error appears in the above-identified patent and that said Letters Patent is hereby corrected as shown below:

Column 10,
Line 16, replace "as plurality" with -- a plurality --

Signed and Sealed this

Twelfth Day of August, 2003

JAMES E. ROGAN
*Director of the United States Patent and Trademark Office*